United States Patent
Yang et al.

(10) Patent No.: US 12,275,097 B2
(45) Date of Patent: Apr. 15, 2025

(54) TAB WELDING DEVICE

(71) Applicant: WUXI LEAD INTELLIGENT EQUIPMENT CO., LTD., Jiangsu (CN)

(72) Inventors: Xiaofei Yang, Wuxi (CN); Er Cao, Wuxi (CN)

(73) Assignee: WUXI LEAD INTELLIGENT EQUIPMENT CO., LTD., Wuxi (CN)

( * ) Notice: Subject to any disclaimer, the term of this patent is extended or adjusted under 35 U.S.C. 154(b) by 77 days.

(21) Appl. No.: 18/148,602

(22) Filed: Dec. 30, 2022

(65) Prior Publication Data
US 2024/0066640 A1 Feb. 29, 2024

Related U.S. Application Data

(63) Continuation of application No. PCT/CN2022/129206, filed on Nov. 2, 2022.

(30) Foreign Application Priority Data

Aug. 31, 2022 (CN) .......................... 202222308824.8

(51) Int. Cl.
*B23K 37/00* (2006.01)
*B23K 37/02* (2006.01)
(Continued)

(52) U.S. Cl.
CPC ....... *B23K 37/0247* (2013.01); *H01M 50/536* (2021.01); *B23K 2101/36* (2018.08)

(58) Field of Classification Search
CPC .............. B23K 20/005; B23K 37/0435; B23K 37/0443; B23K 37/053; H01L 2224/78823
See application file for complete search history.

(56) References Cited

U.S. PATENT DOCUMENTS 4,764,657 A * 8/1988 Fukukawa .............. B21C 37/08
219/124.1
7,306,132 B2 * 12/2007 Kakutani ............. B23K 20/005
228/110.1
(Continued)

FOREIGN PATENT DOCUMENTS

CN 207127393 U 3/2018
CN 110640379 A 1/2020
(Continued)

OTHER PUBLICATIONS

Search Report issued on May 27, 2023, in corresponding International Application No. PCT/CN2022/129206, 8 pages.

*Primary Examiner* — Erin B Saad
(74) *Attorney, Agent, or Firm* — Maier & Maier, PLLC

(57) ABSTRACT

A tab welding device, including a mounting base, a welding assembly, a swinging member and a driving assembly. The welding assembly is rotatably arranged on the mounting base. The swinging member is connected with the welding assembly. The driving assembly is provided with a moving end capable of reciprocating in a first direction, and the moving end is movably connected with the swinging member and is for driving the swinging member to swing to make the swinging member drive the welding assembly to rotate. With the tab welding device, the driving assembly drives the swinging member to swing, and the swinging member drives the welding assembly to rotate, so the angle of the welding assembly can be adjusted until the welding assembly is adjusted to an angle allowing a tab to be welded easily.

15 Claims, 5 Drawing Sheets

(51) Int. Cl.
*H01M 50/536* (2021.01)
*B23K 101/36* (2006.01)

(56) References Cited

U.S. PATENT DOCUMENTS

| | | | | |
|---|---|---|---|---|
| 7,578,421 | B2 * | 8/2009 | Seyama | B23K 20/005 |
| | | | | 228/904 |
| 9,346,120 | B1 * | 5/2016 | Graff | B06B 3/00 |
| 9,855,623 | B2 * | 1/2018 | Regenberg | B23K 20/10 |
| 11,267,071 | B2 * | 3/2022 | Sunaga | H05K 3/361 |
| 11,285,561 | B2 * | 3/2022 | Copperthite | B23K 20/233 |
| 11,845,140 | B2 * | 12/2023 | Wagenbach | B23K 20/26 |
| 11,938,555 | B2 * | 3/2024 | Sato | B23K 20/103 |
| 2005/0211746 | A1 * | 9/2005 | Kakutani | B23K 20/005 |
| | | | | 228/4.5 |
| 2010/0301533 | A1 * | 12/2010 | Wong | B23K 37/0435 |
| | | | | 269/8 |
| 2011/0214401 | A1 | 9/2011 | Luo et al. | |

FOREIGN PATENT DOCUMENTS

| | | |
|---|---|---|
| CN | 210937839 U | 7/2020 |
| CN | 211866934 U | 11/2020 |
| CN | 215145966 U | 12/2021 |
| WO | 2021195926 A1 | 10/2021 |

* cited by examiner

TAB WELDING DEVICE

TECHNICAL FIELD

The present application relates to the technical field of lithium battery processing equipment, in particular to a tab welding device.

BACKGROUND

In the process of battery cell preparation, a tab needs to be welded on an electrode plate, and the tab is usually in a horizontal state during welding. In order to ensure the welding quality, the angle of a welding head of a welding device needs to be adjusted. An existing welding device adopts worm and worm wheel adjustment which needs to be performed manually, so the degree of automation is low.

SUMMARY

In view of this, it is necessary to provide a highly automated tab welding device to solve the problem that the angle of a welding head of an existing welding device needs to be adjusted manually.

A tab welding device comprises:
a mounting base;
a welding assembly, rotatably arranged on the mounting base;
a swinging member, connected with the welding assembly; and
a driving assembly, provided with a moving end capable of reciprocating in a first direction, the moving end being movably connected with the swinging member, and is for driving the swinging member to swing to make the swinging member drive the welding assembly to rotate.

By means of the tab welding device, the driving assembly drives the swinging member to swing, and the swinging member drives the welding assembly to rotate, so that the angle of the welding assembly can be adjusted until the welding assembly is adjusted to an angle allowing a tab to be welded easily. As the angle adjustment of the welding assembly is realized by the driving assembly, the degree of automation is high, so production efficiency is effectively improved.

In one embodiment, the tab welding device further comprises a first limiting wheel and a second limiting wheel arranged on the mounting base in a spaced mode in a second direction perpendicular to the first direction, the first limiting wheel and the second limiting wheel both are capable of rotating and both abut against the welding assembly, and the welding assembly, in the process of rotation, is capable of driving the first limiting wheel and the second limiting wheel to rotate.

In one embodiment, the driving assembly comprises a swing driver, a first moving plate and a rolling member, the swing driver is in driving connection with the first moving plate to drive the first moving plate to reciprocate in the first direction, and the rolling member is rotatably arranged on the first moving plate; and
the swinging member is provided with a slotted hole, the rolling member is embedded in the slotted hole and capable of moving in the slotted hole when driving the swinging member to swing.

In one embodiment, the driving assembly further comprises a first elastic member connected between the first moving plate and the swinging member, and being for providing a force to make the rolling member abut against an inner wall of the slotted hole.

In one embodiment, the swing driver has a locked state; and
when the swing driver is in the locked state, the swing driver is self-locked and limits the swinging member from swinging.

In one embodiment, the tab welding device further comprises a first connecting base and an adjusting assembly, and the adjusting assembly is arranged on the first connecting base and connected with the mounting base for adjusting the position of the mounting base in the first direction and/or the second direction; and
the first direction and the second direction are perpendicular to each other.

In one embodiment, the adjusting assembly comprises a second connecting base, a first adjusting member, a first connecting plate, a first adjusting block and a second adjusting member, the second connecting base is arranged on the first connecting base in a reciprocating manner in the first direction, the first adjusting member is rotatably arranged on the first connecting base and connected with the second connecting base, and the first adjusting member, in the process of rotation, is for adjusting the position of the second connecting base in the first direction; and
the first connecting plate is arranged on the second connecting base, the mounting base is arranged on the first connecting plate in a reciprocating manner in the second direction, the first adjusting block is arranged on the mounting base, the second adjusting member is rotatably arranged on the first adjusting block and connected with the first connecting plate, and the second adjusting member, in the process of rotation, is for adjusting the position of the mounting base in the second direction.

In one embodiment, the tab welding device further comprises a buffer, the first connecting plate is arranged on the second connecting base in a reciprocating manner in a third direction, the buffer is arranged between the first connecting plate and the second connecting base, and the buffer is used for providing a buffer effect for the first connecting plate when the first connecting plate moves in the third direction relative to the second connecting base.

In one embodiment, the mounting base is provided with an arc-shaped mounting groove, the welding assembly is rotatably arranged in the arc-shaped mounting groove around an axis of the arc-shaped mounting groove, and the tab welding device further comprises a second elastic member connected between the welding assembly and the mounting base for providing a force to make the welding assembly abut against the arc-shaped mounting groove.

In one embodiment, the tab welding device further comprises a second connecting plate and a connecting column, the mounting base is provided with a through hole in the third direction, the connecting column comprises a connecting section and a connecting head, an end of the connecting section is connected with the second connecting plate and penetrates through the through hole, the connecting section is capable of reciprocating in the third direction, the aperture of the through hole is greater than the diameter of the connecting section, the connecting head is connected with an end, away from the second connecting plate, of the connecting section, the second elastic member is connected between the mounting base and the connecting head, and the swinging member and the welding assembly both are connected with the second connecting plate.

In one embodiment, the welding assembly comprises a clasping member and a welding head, the clasping member is rotatably arranged on the mounting base, the swinging member is connected with the clasping member, and the welding head is arranged on the clasping member.

In one embodiment, the clasping member has a clasping state and an open state, and the tab welding device further comprises a locating member arranged on the mounting base;

when the clasping member is in the clasping state, the clasping member locks the welding head; and when the clasping member is in the open state, the welding head is capable of reciprocating in the second direction perpendicular to the first direction, and the welding head, in the process of moving in the second direction, is capable of abutting against the locating member.

In one embodiment, the tab welding device further comprises a second adjusting block arranged on the mounting base, the locating member is arranged on the second adjusting block, and the position of the locating member is adjustable in the second direction.

BRIEF DESCRIPTION OF THE DRAWINGS

In order to more clearly explain the embodiments of the application or the technical scheme in the prior art, the following will briefly introduce the drawings needed in the description of the embodiments or the prior art. Obviously, the drawings in the following description only illustrate some embodiments of the application. For those of ordinary skill in the art, other drawings can be obtained according to the provided drawings without paying creative labor.

DETAILED DESCRIPTION OF THE EMBODIMENTS

Figure 1:
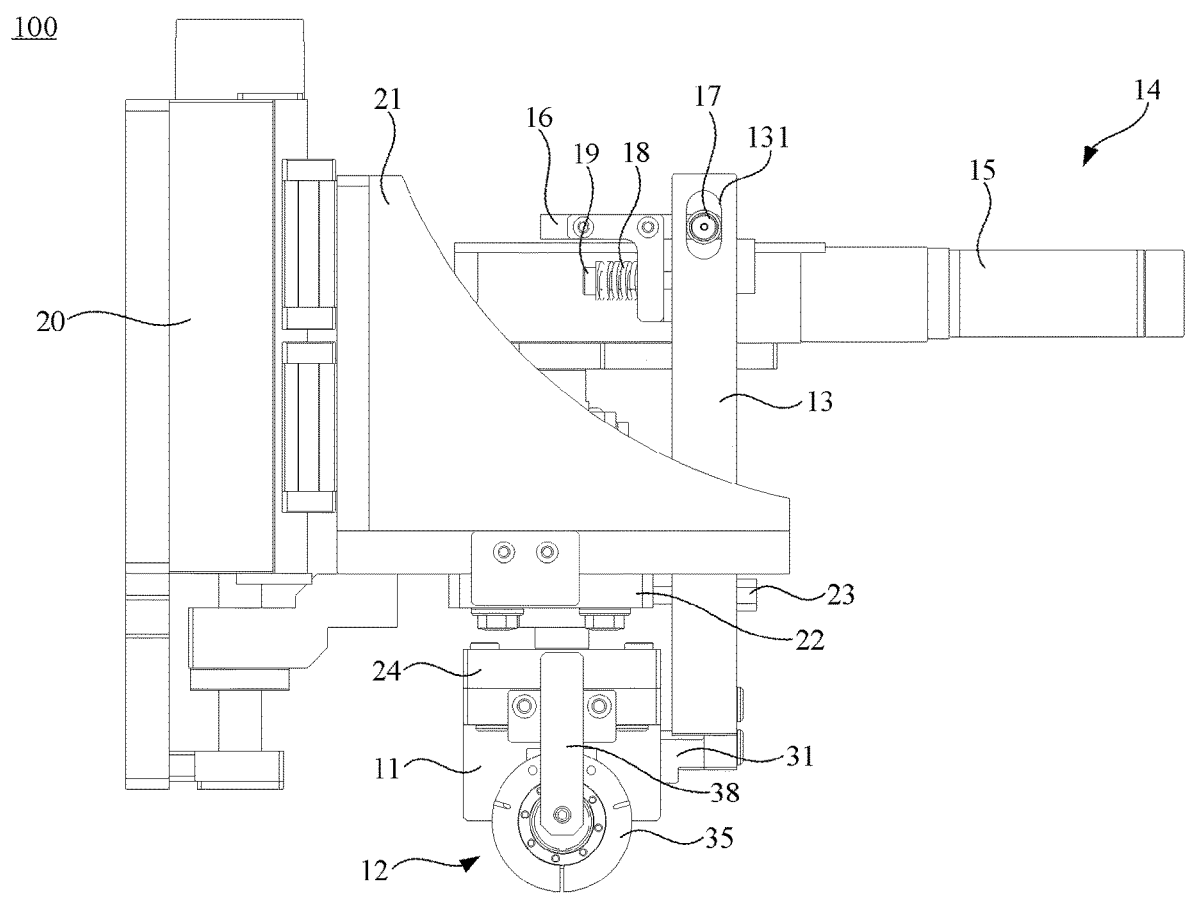
FIG. 1 is a structural diagram of a tab welding device provided by an embodiment of the application.

In order to make the above objects, features and advantages of this application more obvious and understandable, the following detailed description of this application will be made with reference to the accompanying drawings. In the following description, numerous specific details are set forth in order to provide a thorough understanding of the application. However, this application can be implemented in many other ways different from those described here, and those skilled in the art can make similar improvements without violating the connotation of this application. Therefore, this application is not limited by the specific embodiments disclosed below.

In the description of the application, it should be understood that directional or positional relationships indicated by the terms such as "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial" and "circumferential" are based on the directional or positional relationships shown in the drawings, which are only for the convenience of describing the application and simplifying the description, but do not indicate or imply that the referred devices or elements must have a specific orientation or be constructed and operated in a specific orientation, so they cannot be understood as limiting the application.

In addition, the terms "first" and "second" are only used for descriptive purposes, and cannot be understood as indicating or implying relative importance or implicitly indicating the number of indicated technical features. Therefore, the features defined with "first" and "second" may include one or more of the features explicitly or implicitly. In the description of this application, "multiple" means at least two, such as two, three, etc., unless otherwise specifically defined.

In the application, unless otherwise specified and defined, the terms "install", "connect", "attach" and "fix" should be understood in a broad sense. For example, it can be fixed connection, detachable connection or integrated connection; it can be mechanical connection or electric connection; and it can be direct connection, indirect connection through intermediate media or internal communication or interaction of two elements, unless otherwise explicitly defined. For those of ordinary skill in the art, the specific meaning of the above terms in the application can be understood in specific situations.

In this application, unless otherwise specified and limited, a first feature is "above" or "below" a second feature may mean that the first feature and the second feature are in direct contact, or the first feature and the second feature are in indirect contact through an intermediary. Further, the first feature is "above" the second feature may be that the first feature is directly above or obliquely above the second feature, or it only means that a level of the first feature is higher than that of the second feature; and the first feature is "below" the second feature may be that the first feature is directly below or obliquely below the second feature, or it only means that the level of the first feature is lower than that of the second feature.

It should be noted that when an element is described as being "fixed to" or "arranged on" another element, it may be directly on another element or there may be an intermediate element. When an element is considered to be "connected" to another element, it may be directly connected with another element or there may be an intermediate element. The terms "vertical", "horizontal", "upper", "lower", "left", "right" and similar expressions used herein are for the purpose of illustration only, and are not meant to be the only implementation way.

Figure 2:
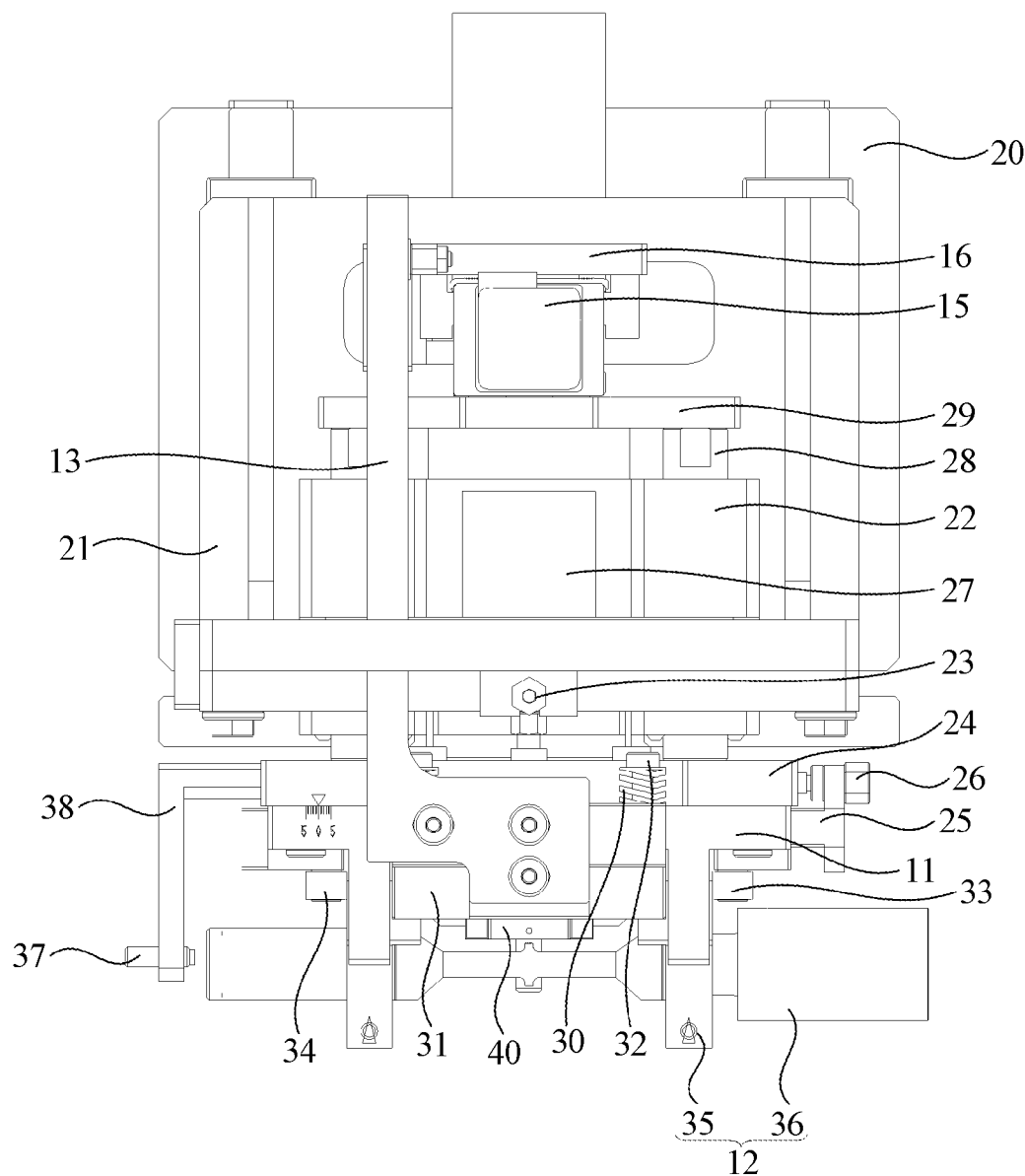
FIG. 2 is a right side view of the tab welding device shown in FIG. 1.

As shown in FIGS. 1 and 2, a tab welding device 100 according to an embodiment of the application comprises a mounting base 11, a welding assembly 12, a swinging member 13 and a driving assembly 14.

The welding assembly 12 is rotatably arranged on the mounting base 11, and the swinging member 13 is connected with the welding assembly 12.

The driving assembly 14 is provided with a moving end capable of reciprocating in a first direction, and the moving end is movably connected with the swinging member 13, and used for driving the swinging member 13 to swing, so that the swinging member 13 drives the welding assembly 12 to rotate.

It should be noted that in this embodiment, the first direction is the left-right direction in FIG. 1, and is perpendicular to the principal plane in FIG. 2.

In addition, in this embodiment, the tab welding device is used to weld a tab to an electrode plate.

By means of the above tab welding device, the driving assembly 14 drives the swinging member 13 to swing, and the swinging member 13 drives the welding assembly 12 to rotate, so that the angle of the welding assembly 12 can be adjusted until the welding assembly 12 is adjusted to an angle allowing a tab to be welded easily. As the angle adjustment of the welding assembly 12 is realized by the driving assembly 14, the degree of automation is high, so production efficiency is effectively improved.

In some embodiments, the swinging member 13 is provided with a slotted hole 131, and the moving end is embedded in the slotted hole 131. And when the moving end drives the swinging member 13 to swing, the moving end can move in the slotted hole 131.

In some embodiments, the driving assembly 14 comprises a swing driver 15, a first moving plate 16 and a rolling member 17, the swing driver 15 is in driving connection with the first moving plate 16 to drive the first moving plate 16 to reciprocate in the first direction, and the rolling member 17 is rotatably arranged on the first moving plate 16.

It can be understood that the rolling member 17 is a moving end and embedded in the slotted hole 131. When the rolling member 17 drives the swinging member 13 to swing, the rolling member 17 can move in the slotted hole 131. Because the rolling member 17 can rotate, the rolling member 17 rolls in the slotted hole 131.

Further, the driving assembly 14 further comprises a first elastic member 18 which is connected between the first moving plate 16 and the swinging member 13, and used for providing a force to make the rolling member 17 abut against an inner wall of the slotted hole 131.

The first elastic member 18 makes the rolling member 17 abut against the inner wall of the slotted hole 131, thus preventing the rolling member 17 from swaying in the slotted hole 131 in the swinging process of the swinging member 13, and further ensuring that the driving assembly 14 can accurately drive the swinging member 13 to swing by a certain angle, that is, accurately adjust the rotating angle of the welding assembly 12.

In practice, the driving assembly 14 further comprises a guide column 19 which penetrates through the first moving plate 16 and can reciprocate in the first direction. An end of the guide column 19 is connected with the swinging member 13, and the first elastic member 18 is connected between the guide column 19 and the first moving plate 16.

Specifically, the first elastic member 18 is a spring.

In some embodiments, the swing driver 15 has a driving state and a locked state.

When the swing driver 15 is in the driving state, the swing driver 15 drives the first moving plate 16 to move, thereby indirectly driving the swinging member 13 to swing. When the swing driver 15 is in the locked state, the swing driver 15 is self-locked and limits the movement of the first moving plate 16, thus limiting the swing of the swinging member 13, so as to prevent the welding assembly 12 from rotating after adjustment is completed, which ensures welding accuracy.

Specifically, the swing driver 15 is a band-type brake motor or other motors which can realize self-locking.

Figure 3:
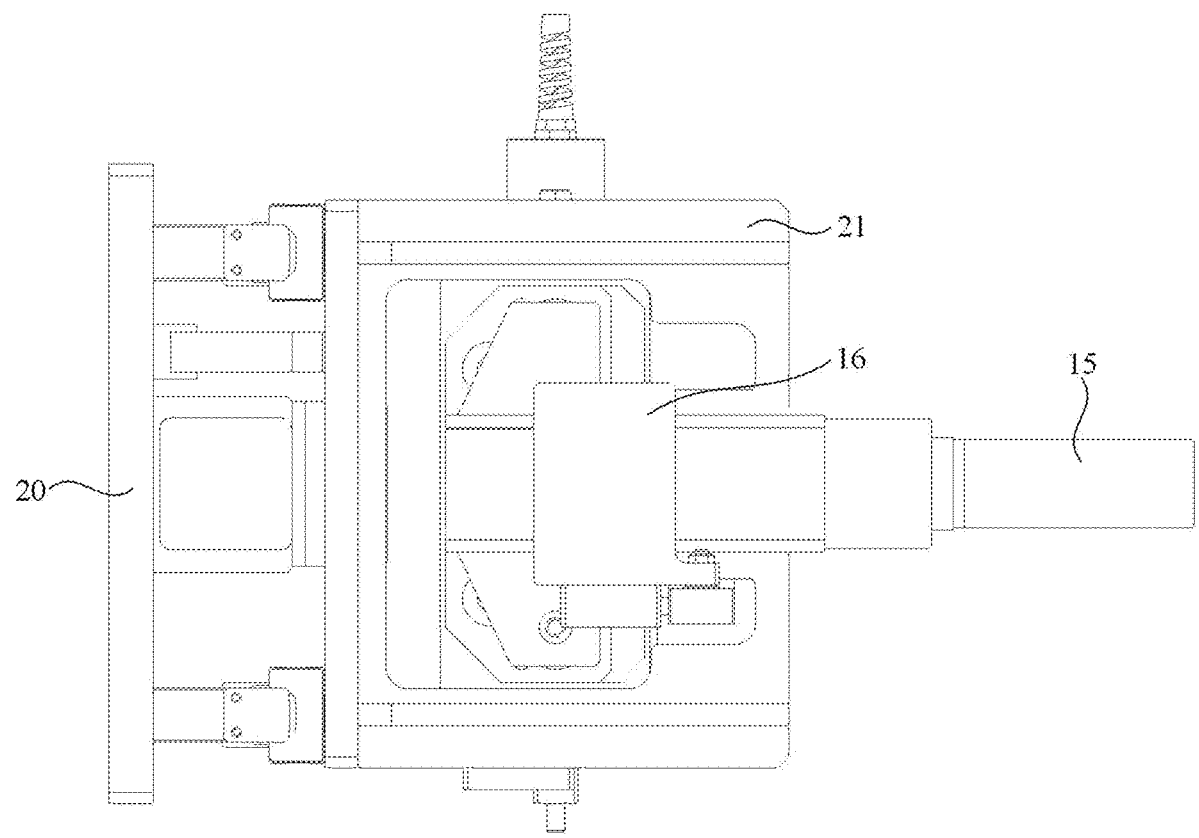
FIG. 3 is a top view of the tab welding device shown in FIG. 1.

Referring to FIG. 3, in some embodiments, the tab welding device further comprises a lifting assembly 20 which is in driving connection with the mounting base 11 to drive the mounting base 11 to reciprocate in a third direction to move close to and away from the electrode plate.

The third direction is the up-down direction in FIG. 1, and in practical application, the third direction is a vertical direction.

It should be noted that the lifting assembly 20 comprises a motor and a screw nut, and the motor is in driving connection with the mounting base 11 through the screw nut, so as to drive the mounting base 11 to move vertically.

Figure 4:
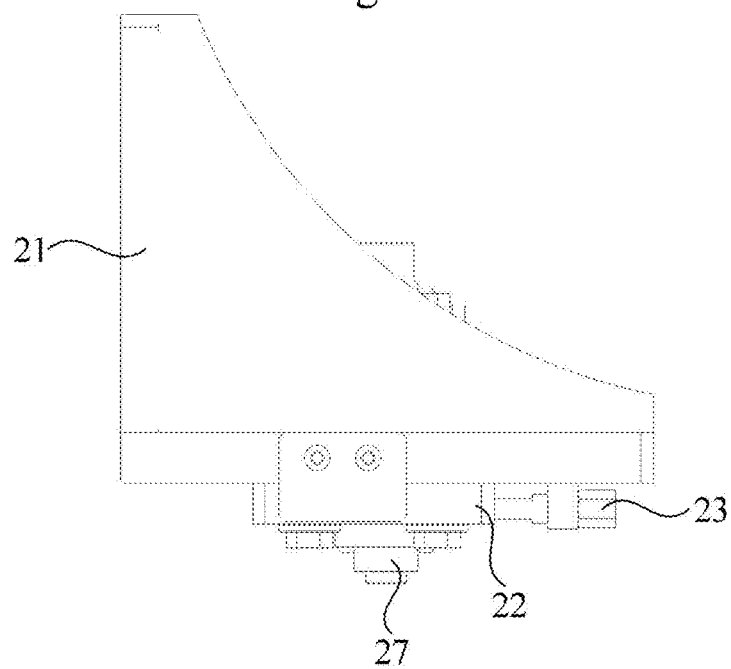
FIG. 4 is a structural diagram of some assemblies in the tab welding device shown in FIG. 1.
Figure 5:
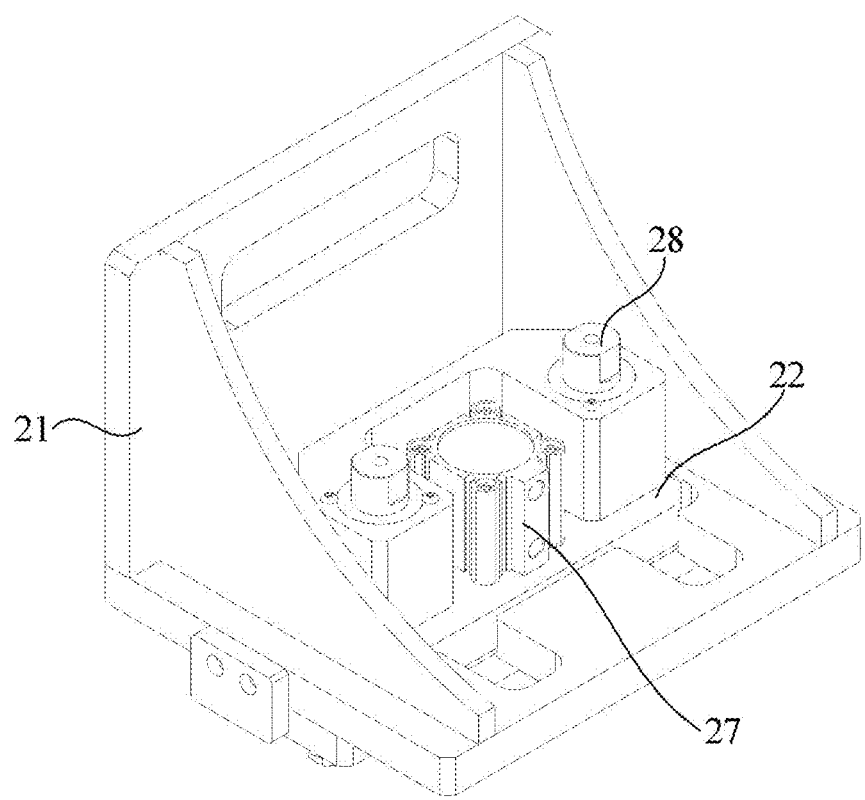
FIG. 5 is a structural diagram of some assemblies shown in FIG. 4 from another direction.

Referring to FIGS. 4 and 5, in some embodiments, the tab welding device further comprises a first connecting base 21 and an adjusting assembly, and the adjusting assembly is arranged on the first connecting base 21 and connected with the mounting base 11 for adjusting the position of the mounting base 11 in the first direction and/or the second direction.

The second direction and the first direction are perpendicular to each other, and the second direction is the left-right direction in FIG. 2.

In some embodiments, the adjusting assembly comprises a second connecting base 22 and a first adjusting member 23, the lifting assembly 20 is in driving connection with the first connecting base 21, the second connecting base 22 is arranged on the first connecting base 21 in a reciprocating manner in the first direction, the mounting base 11 is arranged on the second connecting base 22, the first adjusting member 23 is rotatably arranged on the first connecting base 21 and connected with the second connecting base 22, and the first adjusting member 23 is used for adjusting the position of the second connecting base 22 in the first direction in the process of rotation.

Further, the first adjusting member 23 is a screw, and the screw is rotatably arranged on the first connecting base 21 and in screwed connection with the second connecting base 22, so as to adjust the positions of the second connecting base 22 and the mounting base 11 in the first direction during rotation.

It should be noted that the second connecting base 22 and the first connecting base 21 can be connected by a key with a guiding function, so that the second connecting base 22 can reciprocate in the first direction relative to the first connecting base 21.

Figure 6:
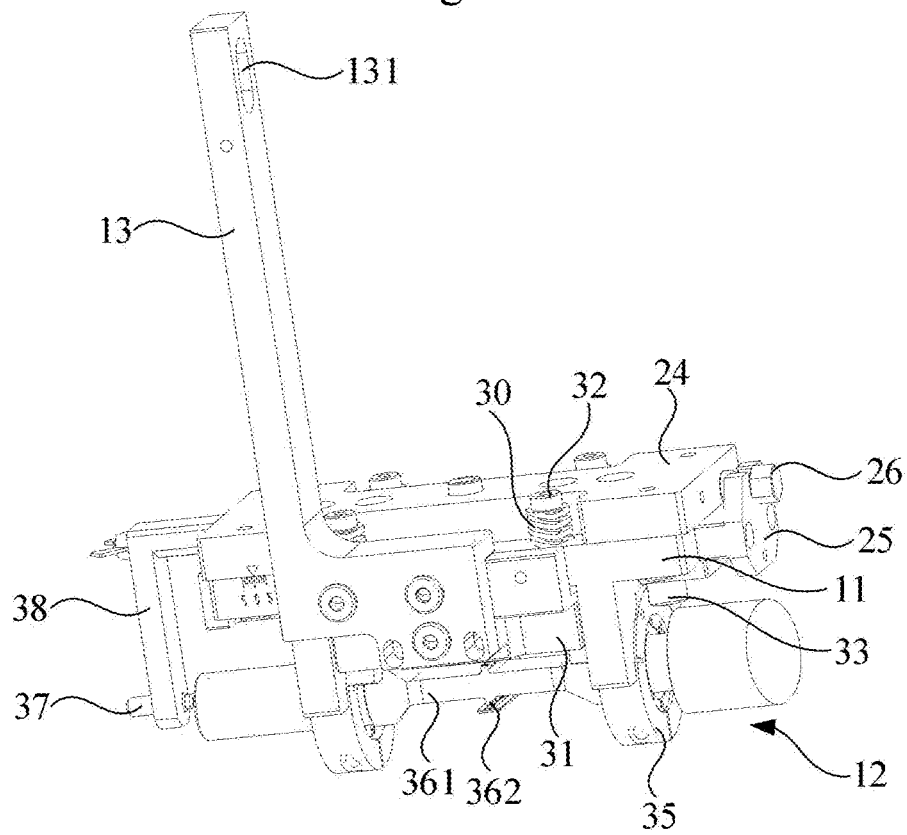
FIG. 6 is a structural diagram of some assemblies in the tab welding device shown in FIG. 1.
Figure 7:
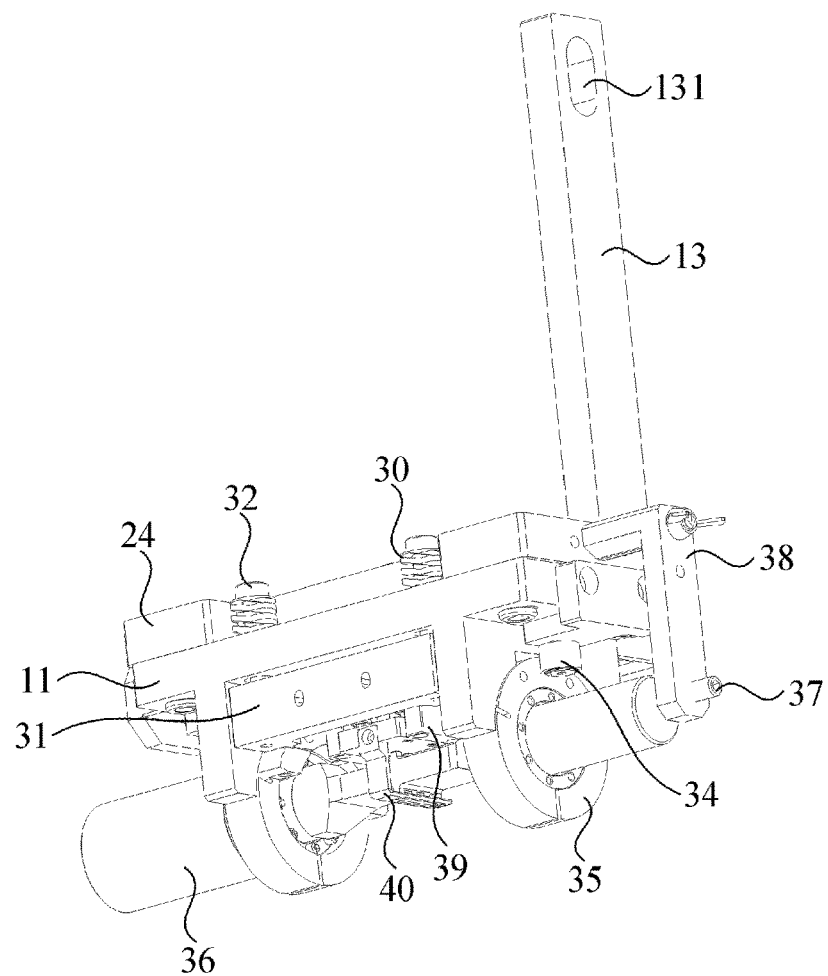
FIG. 7 is a structural diagram of some assemblies shown in FIG. 6 from another direction.

Referring to FIGS. 6 and 7, in some embodiments, the adjusting assembly further comprises a first connecting plate 24, a first adjusting block 25 and a second adjusting member 26, the first connecting plate 24 is arranged on the second connecting base 22, the mounting base 11 is arranged on the first connecting plate 24 in a reciprocating manner in the second direction, the first adjusting block 25 is arranged on the mounting base 11, the second adjusting member 26 is rotatably arranged on the first adjusting block 25 and connected with the first connecting plate 24, and the second adjusting member 26 is used for adjusting the position of the mounting base 11 in the second direction in the process of rotation.

It should be noted that, the second adjusting member 26 is a screw, and the mounting base 11 and the first connecting plate 24 can be connected by a key with a guiding function, so that the mounting base 11 can reciprocate in the second direction relative to the first connecting plate 24.

The first adjusting member 23 and the second adjusting member 26 respectively adjust the positions of the second connecting base 22 and the mounting base 11 before welding, so as to realize position adjustment of the welding assembly 12 in the first direction and the second direction, and make the welding assembly 12 aligned with the tab and the electrode plate, thus ensuring welding accuracy.

In addition, the mounting base 11 is provided with a scale, which can calibrate the position of the mounting base 11 when the position of the mounting base 11 is adjusted in the second direction, thus ensuring adjustment accuracy.

Referring to FIG. 5, in some embodiments, the tab welding device further comprises a buffer 27, the first connecting plate 24 is arranged on the second connecting base 22 in a reciprocating manner in the third direction, the buffer 27 is arranged between the first connecting plate 24 and the second connecting base 22, and the buffer 27 is used for providing a buffer effect for the first connecting plate 24 when the first connecting plate 24 moves in the third direction relative to the second connecting base 22.

In this way, when the lifting assembly 20 drives the first connecting base 21 to move toward the tab, the welding assembly 12 on the mounting base 11 will make contact with the tab, and at this point, the first connecting plate 24 will move in the third direction relative to the second connecting base 22, and the buffer 27 can provide a buffer effect for the first connecting plate 24 to prevent the welding assembly 12 from crushing the tab.

In practice, the tab welding device also comprises a guide rod 28, the buffer 27 is an air cylinder, the guide rod 28 is connected with the second connecting base 22 in a reciprocating manner in the third direction, the first connecting plate 24 is connected with the guide rod 28, the air cylinder is arranged on the second connecting base 22, and a telescopic end of the air cylinder is connected with the first connecting plate 24.

It can be understood that in this embodiment, the air cylinder acts as a gas spring to cushion the movement of the first connecting plate 24 relative to the second connecting base 22.

In some embodiments, the tab welding device further comprises a third connecting base 29, the third connecting base 29 and the first connecting plate 24 are connected with two ends of the guide rod 28 respectively, and the swing driver 15 is arranged on the third connecting base 29.

Referring to FIGS. 6 and 7, in some embodiments, the tab welding device further comprises a second elastic member 30 which is connected between the welding assembly 12 and the mounting base 11, and is used to provide a force to make the welding assembly 12 abut against the mounting base 11.

It should be noted that, before welding, the welding assembly 12 needs to be adjusted to be parallel to the tab, this adjustment is fine adjustment, that is, the rotation angle of the welding assembly 12 is small, so the second elastic member 30 is used to arrange the welding assembly 12 on the mounting base 11, and ensuring that the welding assembly 12 can rotate.

In practice, the mounting base 11 is provided with an arc-shaped mounting groove, the welding assembly 12 is rotatably arranged in the arc-shaped mounting groove around an axis of the arc-shaped mounting groove, and the second elastic member 30 is used for providing a force to make the welding assembly 12 abut against the arc-shaped mounting groove.

It can be determined that a surface of the welding assembly 12 in contact with the mounting base 11 is arc-shaped, so as to facilitate the rotation of the welding assembly 12 after being arranged in the arc-shaped mounting groove.

In addition, the axis of the arc-shaped mounting groove is parallel to the second direction.

In some embodiments, the tab welding device further comprises a second connecting plate 31, both the swinging member 13 and the welding assembly 12 are connected with the second connecting plate 31, and the second elastic member 30 is connected between the second connecting plate 31 and the mounting base 11.

It can be understood that the second connecting plate 31 is connected with the welding assembly 12, and the second connecting plate 31 can also rotate with the welding assembly 12, so a gap exists between the second connecting plate 31 and the mounting base 11 to prevent the mounting base 11 from interfering with the rotation of the second connecting plate 31.

In some embodiments, the tab welding device further comprises a connecting column 32 which penetrates through the mounting base 11 and can reciprocate in the third direction, and the second elastic member 30 is connected between the mounting base 11 and the connecting column 32.

It should be noted that the mounting base 11 is provided with a through hole in the third direction, and the connecting column 32 comprises a connecting section and a connecting head; an end of the connecting section is connected with the second connecting plate 31 and penetrates through the through hole, the connecting section is able to reciprocate in the third direction, and the aperture of the through hole is greater than the diameter of the connecting section; and the connecting head is connected with an end, away from the second connecting plate 31, of the connecting section, and the second elastic member 30 is connected between the mounting base 11 and the connecting head. In this way, the connecting column 32 can reciprocate in the third direction, and the connecting column 32 can swing in the through hole, so that the welding assembly 12 can rotate.

In practice, the second elastic member 30 is a spring, which is sleeved on the connecting section, and the spring and the second connecting plate 31 are located on two opposite sides of the mounting base 11 in the third direction respectively, so as to position the welding assembly 12 in the mounting groove.

It can be understood that the diameter of the connecting head is greater than the radial dimension of the connecting section, so that the connecting head can abut against the second elastic member 30 sleeved on the connecting section.

In some embodiments, the tab welding device further comprises a limiting assembly, which is arranged on the mounting base 11 and used for limiting the movement of the welding assembly 12 in the second direction.

It can be understood that the welding assembly 12 is arranged in the arc-shaped mounting groove, and the arc-shaped mounting groove does not restrict the rotation of the welding assembly 12 and movement thereof in the second direction. Therefore, the limiting assembly is arranged on the mounting base 11 to restrict the movement of the welding assembly 12 in the second direction and ensure that the welding assembly 12 will not move relative to the mounting base 11, thus further ensuring welding accuracy.

In some embodiments, the limiting assembly comprises a first limiting wheel 33 and a second limiting wheel 34 which are arranged on the mounting base 11 in a spaced manner in the second direction, the first limiting wheel 33 and the second limiting wheel 34 both are able to rotate, the first limiting wheel 33 and the second limiting wheel 34 both abut against the welding assembly 12, the welding assembly 12 can drive the first limiting wheel 33 and the second limiting wheel 34 to rotate during rotation, and the first limiting wheel 33 and the second limiting wheel 34 can limit the movement of the welding assembly 12 in the second direction.

It should be explained that both the first limiting wheel 33 and the second limiting wheel 34 abut against the welding assembly 12, and the welding assembly 12 can drive the first limiting wheel 33 and the second limiting wheel 34 to rotate when the welding assembly 12 rotates, that is, the first limiting wheel 33 and the second limiting wheel 34 can roll on a surface of the welding assembly 12. In this way, the first limiting wheel 33 and the second limiting wheel 34 can not only limit the welding assembly 12, but also reduce friction and loss because the first limiting wheel 33 and the second limiting wheel 34 roll on the surface of the welding assembly 12.

In some embodiments, the welding assembly 12 comprises a clasping member 35 and a welding head 36. The clasping member 35 is arranged on the mounting base 11, the swinging member 13 is connected with the clasping member 35, and the welding head 36 is arranged on the clasping member 35 and can rotate with the clasping member 35.

Further, the tab welding device further comprises a locating member 37 which is arranged on the mounting base 11, and the clasping member 35 has an open state and a clasping state.

When the clasping member 35 is in the open state, the welding head 36 can reciprocate in the second direction, and the welding head 36 can abut against the locating member 37 in the process of moving in the second direction, so as to be positioned by the locating member 37. When the clasping member 35 is in the clasping state, the clasping member 35 locks the welding head 36.

It can be understood that when the clasping member 35 is in the open state, the welding head 36 can reciprocate in the second direction, and the welding head 36 can be replaced at this point.

In practice, the clasping member 35 is a hold hoop, and there are two hold hoops. The two hold hoops are arranged on the second connecting plate 31 in a spaced manner in the second direction, the two hold hoops respectively abut against two mounting grooves on the mounting base 11, and the first limiting wheel 33 and the second limiting wheel 34 respectively abut against the two hold hoops.

In some embodiments, the tab welding device further comprises a second adjusting block 38 which is arranged on the mounting base 11, the locating member 37 is arranged on the second adjusting block 38, and the position of the locating member 37 is adjustable in the second direction, so that the position of the welding head 36 can be adjusted to enable the clasping member 35 to lock different welding heads 36.

In practice, the second adjusting block 38 is arranged on the first connecting plate 24, and the locating member 37 is a positioning screw which is in screwed connection with the second adjusting block 38.

In some embodiments, the welding head 36 comprises a connecting part 361 and a welding part 362. The connecting part 361 is connected with the clasping member 35, and the welding part 362 is arranged on the connecting part 361. In this embodiment, the welding part 362 is used for welding the tab to the electrode plate.

It can be understood that the driving assembly 14 drives the welding assembly 12 to rotate through the swinging member 13 in order to adjust the angle of the welding part 362, so that the welding part 362 is parallel to the tab, thus ensuring the welding quality.

Figure 8:
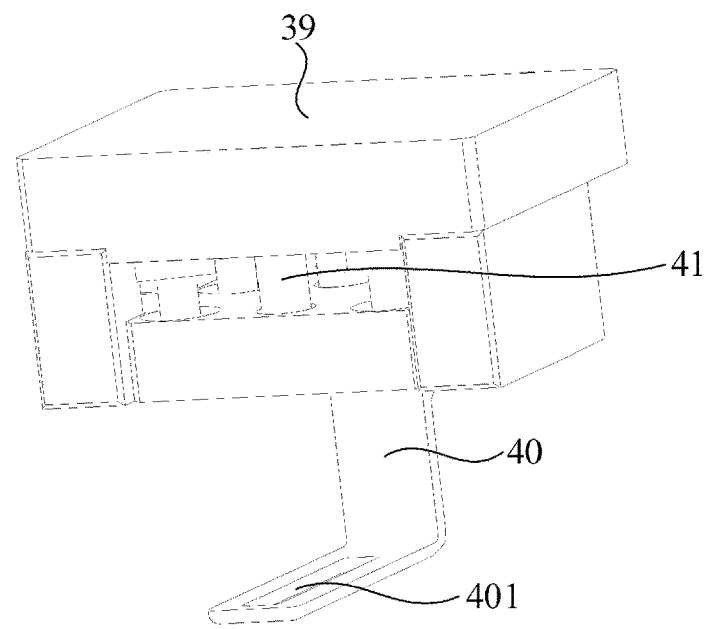
FIG. 8 is a structural diagram of a third connecting plate, a third elastic member and a pressing plate among some assemblies shown in FIG. 7.

Referring to FIGS. 6 to 8, in some embodiments, the tab welding device further comprises a third connecting plate 39 and a pressing plate 40, the third connecting plate 39 is arranged on the second connecting plate 31, the pressing plate 40 is arranged on the third connecting plate 39 in a reciprocating manner in a fourth direction, and the pressing plate 40 is provided with a through groove 401. During the movement of the pressing plate 40 in the fourth direction, a welding surface of the welding part 362 can pass through the through groove 401, so as to weld the tab to the electrode plate.

It should be noted that the fourth direction is perpendicular to the axis of the arc-shaped mounting groove, and since the third connecting plate 39 is arranged on the second connecting plate 31, the fourth direction will change with the rotation of the welding assembly 12.

Therefore, when the welding assembly 12 approaches the tab, the pressing plate 40 will make contact with the tab and the electrode plate first, that is, the pressing plate 40 will press against the tab and the electrode plate, and then the welding surface of the welding part 362 will pass through the through groove 401 and weld the tab to the electrode plate. After welding is completed, the welding part 362 will be separated from the tab and the electrode plate, and then the pressing plate 40 will be separated from the tab and the electrode plate, thus preventing the tab and the electrode plate from sticking to the welding part 362 to be lifted up.

In practice, the tab welding device further comprises a third elastic member 41 which is connected between the pressing plate 40 and the third connecting plate 39 and used to provide a force to keep the pressing plate 40 away from the third connecting plate 39, so as to ensure that the pressing plate 40 presses the tab and the electrode plate tightly and the tab and the electrode plate will not be lifted up.

In order to understand the technical scheme of this application, the operation process of the tab welding device in the above embodiment will be described below, and this description assumes that the tab welding device is used to weld a tab to an electrode plate, and the tab is in a horizontal state.

At the beginning, the clasping member 35 is in the open state, and the position of the locating member 37 is adjusted according to the model of the welding head 36. Then, the welding head 36 is inserted into the clasping member 35 until an end of the welding head 36 abuts against the locating member 37, while ensuring that the welding part 362 of the welding head 36 corresponds to the through groove 401 in the pressing plate 40. Next, the clasping member 35 is switched to the clasping state to lock and fix the welding head 36.

After the welding head 36 is locked and fixed, the position of the welding head 36 is adjusted in the first direction and the second direction according to the positions of the tab and the electrode plate.

Specifically, by rotating the first adjusting member 23, the second connecting base 22 can move in the first direction relative to the first connecting base 21, thus adjusting the position of the second connecting base 22 in the first direction and indirectly adjusting the position of the welding head 36 in the first direction. By rotating the second adjusting member 26, the mounting base 11 can move in the second direction relative to the first connecting plate 24, thereby adjusting the position of the mounting base 11 in the second direction and indirectly adjusting the position of the welding head 36 in the second direction.

After the position of the welding head 36 is adjusted in the first direction and the second direction, the swing driver 15 acts to drive the swinging member 13 to swing, and the swinging member 13 drives the second connecting plate 31 and the clasping member 35 to rotate, thus driving the welding head 36 to rotate until the welding surface of the welding part 362 is in a horizontal state.

Finally, the lifting assembly 20 drives the first connecting base 21 to move in the third direction, so that the welding head 36 is close to the tab and the electrode plate. In this process, the pressing plate 40 first presses against the tab and the electrode plate, and then the welding surface of the welding part 362 passes through the through groove 401 to weld the tab to the electrode plate.

After welding, the lifting assembly 20 drives the first connecting base 21 to drive the welding head 36 away from the tab and the electrode plate, and the welding part 362 is separated from the tab and the electrode plate before the pressing plate 40.

The technical features of the above embodiments can be combined freely. In order to make the description concise, not all possible combinations of the technical features in the above embodiments are described. However, as long as there is no contradiction in the combinations of these technical features, they should be considered as falling within the scope recorded in this specification.

The above embodiments only represent several implementation ways of the application, and their descriptions are specific and detailed, but they cannot be understood as limiting the scope of the patent of the application. It should be pointed out that, for those of ordinary skill in the art, without departing from the concept of the application, several modifications and improvements can be made, which belong to the protection scope of the application. Therefore, the scope of protection of the patent of the application shall be subject to the appended claims.

What is claimed is:

1. A tab welding device, comprising:
   a mounting base;
   a welding assembly, rotatably arranged on the mounting base;
   a swinging member, connected with the welding assembly; and
   a driving assembly, provided with a moving end capable of reciprocating in a first direction, the moving end being movably connected with the swinging member, and being for driving the swinging member to swing to make the swinging member drive the welding assembly to rotate;
   wherein the mounting base is provided with an arc-shaped mounting groove, and the welding assembly is rotatably arranged in the arc-shaped mounting groove around an axis of the arc-shaped mounting groove;
   wherein the driving assembly comprises a swing driver, a first moving plate, and a rolling member, the swing driver is in driving connection with the first moving plate to drive the first moving plate to reciprocate in the first direction, and the rolling member is rotatably arranged on the first moving plate; and the swinging member is provided with a slotted hole, the rolling member is embedded in the slotted hole and capable of moving in the slotted hole when driving the swinging member to swing.

2. The tab welding device of claim 1, further comprising a first limiting wheel and a second limiting wheel arranged on the mounting base in a spaced mode in a second direction perpendicular to the first direction, the first limiting wheel and the second limiting wheel both being capable of rotating and both abutting against the welding assembly, and the welding assembly, in the process of rotation, being capable of driving the first limiting wheel and the second limiting wheel to rotate.

3. The tab welding device of claim 1, wherein the driving assembly further comprises a first elastic member connected between the first moving plate and the swinging member, and being for providing a force to make the rolling member abut against an inner wall of the slotted hole.

4. The tab welding device of claim 1, wherein the swing driver has a locked state; and
   when the swing driver is in the locked state, the swing driver is self-locked and limits the swinging member from swinging.

5. The tab welding device of claim 1, further comprising a first connecting base and an adjusting assembly, and the adjusting assembly being arranged on the first connecting base and connected with the mounting base for adjusting a position of the mounting base in the first direction and/or the second direction;
   wherein the first direction and the second direction are perpendicular to each other.

6. The tab welding device according to claim 5, wherein the adjusting assembly comprises a second connecting base, a first adjusting member, a first connecting plate, a first adjusting block and a second adjusting member, the second connecting base is arranged on the first connecting base in a reciprocating manner in the first direction, the first adjusting member is rotatably arranged on the first connecting base and connected with the second connecting base, and the first adjusting member, in the process of rotation, is for adjusting a position of the second connecting base in the first direction; and
   the first connecting plate is arranged on the second connecting base, the mounting base is arranged on the first connecting plate in a reciprocating manner in the second direction, the first adjusting block is arranged on the mounting base, the second adjusting member is rotatably arranged on the first adjusting block and connected with the first connecting plate, and the second adjusting member, in the process of rotation, is for adjusting the position of the mounting base in the second direction.

7. The tab welding device of claim 6, further comprising a buffer, the first connecting plate being arranged on the second connecting base in a reciprocating manner in a third direction, the buffer being arranged between the first connecting plate and the second connecting base, and the buffer being for providing a buffer effect for the first connecting plate when the first connecting plate moves in the third direction relative to the second connecting base.

8. The tab welding device of claim 3, wherein the tab welding device further comprises a second elastic member connected between the welding assembly and the mounting base for providing a force to make the welding assembly abut against the arc-shaped mounting groove.

9. The tab welding device of claim 6, further comprising a second connecting plate and a connecting column, the mounting base being provided with a through hole in the third direction, the connecting column comprising a connecting section and a connecting head, an end of the connecting section being connected with the second connecting plate and penetrating through the through hole, the connecting section being capable of reciprocating in the third direction, an aperture of the through hole being greater than a diameter of the connecting section, the connecting head being connected with an end, away from the second connecting plate, of the connecting section, the second elastic member being connected between the mounting base and the connecting head, and the swinging member and the welding assembly both being connected with the second connecting plate.

10. The tab welding device of claim 1, wherein the welding assembly comprises a clasping member and a welding head, the clasping member is rotatably arranged on the mounting base, the swinging member is connected with the clasping member, and the welding head is arranged on the clasping member.

11. The tab welding device of claim 10, wherein the clasping member has a clasping state and an open state, and the tab welding device further comprises a locating member arranged on the mounting base;
when the clasping member is in the clasping state, the clasping member locks the welding head; and
when the clasping member is in the open state, the welding head is capable of reciprocating in a second direction perpendicular to the first direction, and the welding head, in the process of moving in the second direction, is capable of abutting against the locating member.

12. The tab welding device of claim 11, further comprising a second adjusting block arranged on the mounting base, the locating member being arranged on the second adjusting block, and a position of the locating member being adjustable in the second direction.

13. The tab welding device of claim 2, further comprising a first connecting base and an adjusting assembly, and the adjusting assembly being arranged on the first connecting base and connected with the mounting base for adjusting a position of the mounting base in the first direction and/or the second direction;
wherein the first direction and the second direction are perpendicular to each other.

14. The tab welding device of claim 3, further comprising a first connecting base and an adjusting assembly, and the adjusting assembly being arranged on the first connecting base and connected with the mounting base for adjusting a position of the mounting base in the first direction and/or the second direction;
wherein the first direction and the second direction are perpendicular to each other.

15. The tab welding device of claim 2, wherein the welding assembly comprises a clasping member and a welding head, the clasping member is rotatably arranged on the mounting base, the swinging member is connected with the clasping member, and the welding head is arranged on the clasping member.

* * * * *